United States Patent
Gabryjelski et al.

(10) Patent No.: US 9,619,640 B2
(45) Date of Patent: **\*Apr. 11, 2017**

(54) ENHANCEMENT TO VOLUME LICENSE KEYS

(75) Inventors: Henry P. Gabryjelski, Seattle, WA (US); Wesley Miller, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/939,754

(22) Filed: Nov. 4, 2010

(65) Prior Publication Data

US 2011/0055575 A1    Mar. 3, 2011

Related U.S. Application Data

(62) Division of application No. 10/805,371, filed on Mar. 19, 2004, now Pat. No. 7,853,790.

(51) Int. Cl.
*H04L 9/32*     (2006.01)
*G06F 21/33*    (2013.01)
*G06F 21/10*    (2013.01)
*G06Q 50/18*    (2012.01)

(52) U.S. Cl.
CPC .......... *G06F 21/335* (2013.01); *G06F 21/105* (2013.01); *G06Q 50/184* (2013.01)

(58) Field of Classification Search
CPC ... H04L 9/3294; G06F 21/335; G06F 21/105; G06Q 50/184
USPC ............... 713/150, 156, 168–169, 173, 175; 380/279; 705/51, 59, 310
See application file for complete search history.

(56) References Cited

U.S. PATENT DOCUMENTS

| | | | |
|---|---|---|---|
| 5,005,200 A | 4/1991 | Fischer | |
| 5,978,484 A | 11/1999 | Apperson et al. | |
| 6,189,146 B1 | 2/2001 | Misra et al. | |
| 6,219,652 B1 | 4/2001 | Carter et al. | |
| 6,285,991 B1 * | 9/2001 | Powar | 705/76 |
| 6,301,658 B1 | 10/2001 | Koehler | |
| 6,310,966 B1 | 10/2001 | Dulude et al. | |
| 6,324,645 B1 | 11/2001 | Andrews et al. | |
| 6,553,493 B1 | 4/2003 | Okumura et al. | |
| 6,615,347 B1 | 9/2003 | de Silva et al. | |
| 6,976,163 B1 * | 12/2005 | Hind | G06F 21/572 713/1 |
| 7,069,595 B2 | 6/2006 | Cognigni et al. | |
| 7,165,174 B1 | 1/2007 | Ginter et al. | |

(Continued)

*Primary Examiner* — Farid Homayounmehr
*Assistant Examiner* — Suman Debnath
(74) *Attorney, Agent, or Firm* — Lee & Hayes, PLLC

(57) ABSTRACT

A method includes issuing a digital certificate to a licensee, the digital certificate identifying a licensed product and the licensee to enable the licensee to enable the licensed product. The method involves receiving a request to enable the licensed product from an entity, the request including the digital certificate and determining whether the entity is the licensee of the licensed product based on the digital certificate. A system includes a relational structure having associations among authorized entities and digital certificates within an organization. Each to digital certificate identifies a licensed product licensed to the organization. A certificate distribution module distributes the digital certificates to associated authorized entities.

20 Claims, 6 Drawing Sheets

(56) References Cited

U.S. PATENT DOCUMENTS

| | | |
|---|---|---|
| 7,747,531 B2 | 6/2010 | Cronce |
| 2001/0013024 A1* | 8/2001 | Takahashi ............... G06F 21/10 705/59 |
| 2001/0039614 A1 | 11/2001 | Hellberg et al. |
| 2002/0004901 A1 | 1/2002 | Yip et al. |
| 2002/0059144 A1 | 5/2002 | Meffert et al. |
| 2002/0065780 A1 | 5/2002 | Barritz et al. |
| 2002/0138441 A1 | 9/2002 | Lopatic |
| 2003/0059043 A1 | 3/2003 | Okeya |
| 2003/0061483 A1 | 3/2003 | Schell et al. |
| 2003/0140225 A1* | 7/2003 | Banks .................... G06Q 20/02 713/155 |
| 2003/0149670 A1* | 8/2003 | Cronce ................. G06F 21/121 705/59 |
| 2003/0156714 A1 | 8/2003 | Okeya |
| 2004/0039916 A1* | 2/2004 | Aldis et al. ................... 713/177 |
| 2004/0148505 A1* | 7/2004 | Qiu ............................... 713/175 |
| 2006/0041760 A1* | 2/2006 | Huang ......................... 713/189 |
| 2007/0044159 A1* | 2/2007 | Ishiguro ................. G06F 21/10 726/27 |

\* cited by examiner

ENHANCEMENT TO VOLUME LICENSE KEYS

CROSS REFERENCE TO RELATED APPLICATIONS

This patent application is a divisional application of co-pending, commonly owned U.S. patent application Ser. No. 10/805,371, entitled "Enhancement to Volume License Keys", filed on Mar. 19, 2004, which application is incorporated herein by reference.

TECHNICAL FIELD

The described subject matter relates to electronic computing, and more particularly to systems and methods for volume licensing using digital certificates.

BACKGROUND

Protecting software and other works from improper copying and use is a serious problem facing vendors of such property. Vendors of software products typically license their products to licensees of the products. The license has terms of use and often can only be activated or made fully functional when the licensee enters an alphanumeric license key, such as a hash license key, that "unlocks" the product, thereby enabling the product or the product's full feature set. A license may be issued to an individual user, or to an organization, such as a corporation, with many potential users. A license to an organization is often referred to as a volume license and the license key for a volume license a volume license key. Unfortunately, a traditional volume license key can be very difficult if not impossible to enforce for a number of reasons.

One reason a traditional volume license key is difficult to enforce is that the license key does not provide a way to validate the identity of the user of the license key. For example, a hash license key consists of a series of letters and numbers that, when entered by the user, are decrypted with a hash algorithm to determine whether the hash license key is a valid license key. Anyone who obtains the hash license key and the identity of the associated product may be able to enter the license key at the vendor's web site, for example, and, since the hash license key is valid, thereby gain access to use the product.

A hash license key can actually be quite easy to obtain. Licensees may intentionally or inadvertently divulge the license key. In a large corporate environment, for example, securing the license key may be particularly difficult. The corporation may be spread over a large geographic area and employ many users who could obtain access to the license key. Once a user obtains access to the license key, the user can pass it on to anyone (even unauthorized users) who will then be able to enable the licensed product with the license key. As a result, the licensee corporation may not be able to control who obtains license keys. Vendors to corporate licensees essentially take it on faith that the licensees will secure the license key from improper use.

In addition, license key generators are tools that rapidly generate alphanumeric sequences. License key generators are readily available to many users. Unscrupulous users can use a license key generator to rapidly and repeatedly generate sequences and enter the sequences into the license key validation mechanism, which will enable the product when the right sequence is entered. Whether improper access to a licensed product is the result of inadvertence on the part of the licensee or unscrupulous behavior, a fundamental flaw in traditional license keys is their inability to identify the user trying to enable the licensed product.

In an attempt to make traditional license keys more secure, vendors have made alphanumeric license keys longer. In general the longer the hash license key, the more secure the license key is. However, vendors also realize that licensees typically would rather not have to enter and keep track of extremely long alphanumeric sequences that make up license keys. To avoid imposing a large burden on customers, vendors typically limit the length of traditional license keys to relatively short lengths, making the license keys more easily determined by a license key generator. Therefore, licensed products are susceptible to improper access, despite traditional license key approaches toward preventing such improper access.

SUMMARY

Implementations are described and claimed herein for enforcing a product license using digital certificates. A product vendor can issue a digital certificate to a licensee, such as an individual user, an organization, or a group within an organization. Because the digital certificate identifies the organizational licensee and the product, an entity of the organization can be authenticated prior to enabling the licensed product. The entity must provide a valid digital certificate in order to enable the licensed product. The organization can reissue the digital certificate to specified users or other entities within the organization.

In some implementations, articles of manufacture are provided as computer program products. One implementation of a computer program product provides a computer program storage medium readable by a computer system and encoding a computer program for generating a digital certificate associated with one or more licensed products. Another implementation of a computer program product may be provided in a computer data signal embodied in a carrier wave by a computing system and encoding the computer program for generating a digital certificate associated with one or more licensed products.

The computer program product encodes a computer program for executing on a computer system a computer process that generates a digital certificate associated with a licensed product. The process further includes receiving a digital certificate including a product identifier and an entity identifier. The process further includes determining whether the requested product is the licensed product and validating the identity of the requesting party based on the entity identifier.

In another implementation, a method includes creating associations between a digital certificate and one or more specified entities in an organization, and issuing the digital certificate to the one or more specified entities based on the associations. The method may further include creating the digital certificate hierarchy from a licensor digital certificate identifying a licensed product and a licensee digital certificate identifying the organization or an entity in the organization. The method may further include receiving the licensor digital certificate from an authorizing entity granting authority to enable the licensed product.

In yet another implementation, a system includes a certificate processor associating a digital certificate with one or more authorized entities in an organization and issuing the digital certificate to the one or more authorized entities. The system may also include a hierarchical structure representing a hierarchy of entities in the organization. The hierarchical structure includes the digital certificate associated with authorized entities at levels of the hierarchy.

DETAILED DESCRIPTION

Overview

Briefly, volume licensing of a product using digital certificates involves issuing a licensor-issued digital certificate to an organization and issuing a child digital certificate based on the licensor-issued digital certificate to authorized entities within the organization, which can use the digital certificate to enable the licensed product. Because traditional volume license keys are highly susceptible to improper use by non-licensed entities, a digital certificate provides a highly secure mechanism for ensuring that only licensed entities can enable and use the licensed product. The volume licensing scheme described herein allows a vendor to issue digital certificates that may include one or more use conditions to an organization. The organization employs a certificate processor for reissuing digital certificates to specified entities within the organization.

Exemplary System

Figure 1:
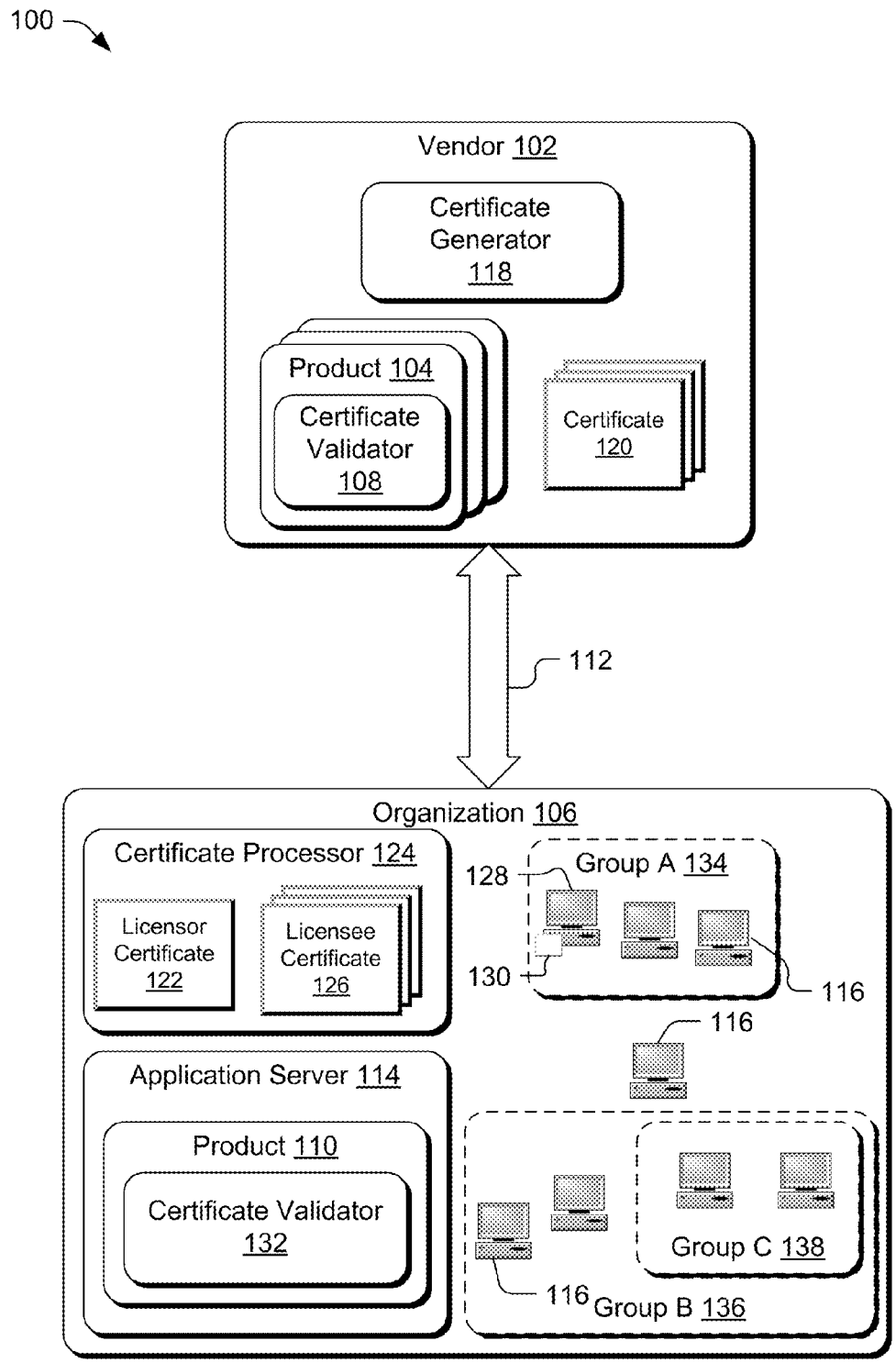
FIG. 1 illustrates an exemplary operating environment in which digital certificates can be used to enforce volume license keys.

FIG. 1 illustrates an exemplary operating environment 100 in which volume licensing using digital certificates can be carried out. A vendor 102 produces software products 104 that can be licensed and distributed to an organization 106. In a particular implementation, the products 104 each include a certificate validator 108. After a product 104 is distributed to the organization 106, the certificate validator 108 determines whether users can enable the product 104 based on digital certificates presented by the users.

The vendor 102 may distribute a particular product 110 to the organization 106 through a third party distributor (not shown), via a communications network 112 (e.g., the Internet), or otherwise. The product 110 is distributed in the form of computer-readable media, such as computer storage media (e.g., compact discs, floppy disks) or communications media. At the organization 106, the product 110 is typically stored on an application server 114. From the application server 114, a user or other organizational entity 116 may use the product 110 if the entity 116 has a proper product-specific digital certificate.

A certificate generator 118 at the vendor 102 generates product-specific digital certificates 120. As such, each of the digital certificates 120 is associated with one of the products 104. The digital certificates 120 are each signed by the issuer (in this case, the vendor 102) using a public key that ensures that the digital certificate 120 cannot be modified. As is discussed further below, the digital certificates 120 can include other information for use in licensing the associated product 104. When the organization 106 purchases one of the products 104, the certificate generator 118 issues an associated one of the digital certificates 120 to the organization 106.

As shown in FIG. 1, the organization 106 purchases and is licensed the product 110. The organization 106, as licensee of the product 110, is issued a product-specific digital certificate 122, referred to as a licensor certificate 122 (which is one of the digital certificates 120), by the vendor 102. The licensor certificate 122 is specific to the product 110. The licensor certificate 122 is stored at the organization 106 where it is used by a certificate processor 124.

The certificate processor 124 can use the licensor certificate 122 received from the vendor 102 to generate other digital certificates 126, referred to as licensee certificates or child certificates 126, which are based on the licensor certificate 122. Because the licensee certificates 126 are based on the licensor certificate 122, the licensee certificates 126 are also specific to the product 110. The certificate processor 124 can combine public portions of the licensor certificate 122 and one or more licensee certificates 126 to create composite certificates, which are discussed further with respect to FIG. 3.

The certificate processor 124 distributes one or more of the composite certificates to organizational entities 116 via a communications media, or storage media, or other distribution mechanisms, within the organization 106. After the certificate processor 124 distributes a composite certificate to an entity 116, the entity 116 can use the composite certificate to enable products for use from the application server 114.

For example, assume that a computer user 128 receives composite certificate 130 that is specific to product 110. In this case, the computer user 128 enters the composite certificate 130 into the product's 110 certificate validator 132. The certificate validator 132 uses the composite certificate 130 authenticates at least two pieces of information: the identity of the requesting entity 128 and whether the requested product is licensed to the requesting entity 128. The certificate validator 132 may also validate other information related to other conditions or restrictions that can be included in the composite certificate 130. For example, the composite certificate can include an expiration date, which the certificate validator 132 can use to determine whether the license has expired. If the certificate validator 132 determines that the composite digital certificate is authentic, the certificate validator 132 enables product 110 for use by the user 128. Enabling the product 110 for use can include enabling a limited feature set or the entire set of features provided by the product 110. The set of features enabled can be specified by use conditions (discussed further below) in the composite digital certificate 130.

One implementation of the certificate validator 132 uses a certificate authority (CA) (not shown) to validate a digital certificate. In this implementation, when the certificate validator 132 receives a product request from an entity 116, the certificate validator 132 uses a public key associated with the CA to validate the composite certificate or a chain of digital certificates including a trusted CA root digital certificate. Using identification information held within the validated digital certificate, the certificate validator 132 can send a reply to the requesting entity 116.

Another implementation of a certificate validator 132 employs a domain naming system (DNS) lookup or a reverse DNS lookup. In such an implementation, the certificate validator 132 interfaces with a DNS (not shown) to locate computers in the organization 106 by domain name. The DNS maintains a database of domain names (host names) and/or internet protocol (IP) addresses along with corresponding licensed entity information. The certificate validator 132 can, for example, obtain a domain name from a digital certificate and query the DNS with the domain name. In response, the DNS will indicate whether the domain name belongs to the organization or entity to which the digital certificate was issued.

Another implementation of a certificate validator 132 embeds a public key from the product-specific certificate 124 within the product 110 in a tamper-resistant manner. When the product 110 requires validation of license information, a check for an installed digital certificate matching the requirements of the program is made. If no matching certificate is found, the existing public key infrastructure (PKI) (not shown) of the organization 106 is used to request an appropriate certificate from the organization's certificate processor 124. If a matching certificate is found (or a new certificate matching the requirements is installed) and the restrictive conditions present in the certificate are validated as having been fulfilled, the certificate validator 132 enables one or more features of the product 110.

As used herein, an organization is a group of entities that are organized for some purpose. Examples of organizations are corporations, companies, churches, associations, governments, and political groups. An entity is anything that exists as a particular and discrete unit within or outside an organization. To illustrate, a computer, a computer user, and a computer process are all examples of entities. An entity may even be another organization.

An entity has identifying information, such as a name, address, domain name, biometric information, etc. In addition, an entity need not be at a fixed physical location. Thus, by way of example, an entity can be part of an organization, but may or may not be at the location (e.g., building or premises) where the organization typically conducts business.

In addition, one or more entities can be grouped together in various ways to achieve various operational goals. As an example, entities may be grouped according to corporate department, geographic location, division, and others. To illustrate, as shown in FIG. 1, a group A 134 includes a number of computers/users 116, and another group B 136 includes a group C 138, both of which include computer/users 116.

In an exemplary implementation, when an entity 116 wants to use the licensed product 110, the entity 116 requests a digital certificate from the certificate processor 124. The certificate processor 124 includes structures and processes for identifying one or more composite digital certificates (digital certificate hierarchy or chain) that the requesting entity 116 is authorized to use, and granting access to or generating new composite digital certificates for the requesting entity 116.

In another implementation of the certificate processor 124, entities 116 enroll with the certificate processor 124. In this implementation, the entities 116 notify the certificate processor 124 when they come on-line. In response, the certificate processor 124 issues the appropriate digital certificate(s) to the enrolling entities 116.

The entities 116 in the organization 106 can be located on-site or off-site while accessing the certificate processor 124. The entities 116 may include full-time employees of the organization 106 or temporary workers (e.g., consultants, contractors). The entities 116 transmit identity information to the certificate processor 124 in order to obtain a digital certificate. The identity information may include information such as computer identifier, biometric information, user passwords, user title, geographic location, domain name, or group. The certificate processor 124 can use such information to determine whether and what digital certificates the entity 116 is authorized to use.

Another implementation of the environment 100 includes a public key infrastructure (PKI) for authenticating the organization 106 and entities 116 within the organization 106 for licensing purposes. Generally, a PKI is a system of digital certificates (and other registration authorities) that verifies and authenticates the validity of each entity 116 involved in a network transaction. PKI lays the groundwork for requiring entities 116 to have an issued key (or password) to enable licensed products. A digital certificate typically contains entity identification information, a copy of the entity's public key (used for encrypting messages and digital signatures), and a public key from the entity that issued the certificate so that a recipient (e.g., the certificate validator 132) can verify that the certificate is authentic.

One implementation of the certificate generator 118 uses a certificate authority (CA) (not shown) to create digital certificates 120. The CA is typically a trusted third-party organization or company that issues digital certificates used to create digital signatures and public-private key pairs. The role of the CA in this process is to guarantee that the entity granting the digital certificate is, in fact, who the entity claims to be. The CA often has an arrangement with a financial institution, such as a credit card company, which provides it with information to confirm an individual's claimed identity. In this implementation of the certificate generator 118, the generator 118 applies for a digital certificate from the CA. The CA issues an encrypted product-specific digital certificate 120 containing the vendor's 102 public key and a variety of other identification information. The generated certificate 120 references the CA's public key as a method of verifying the validity of the generated digital certificate 120.

Figure 2:
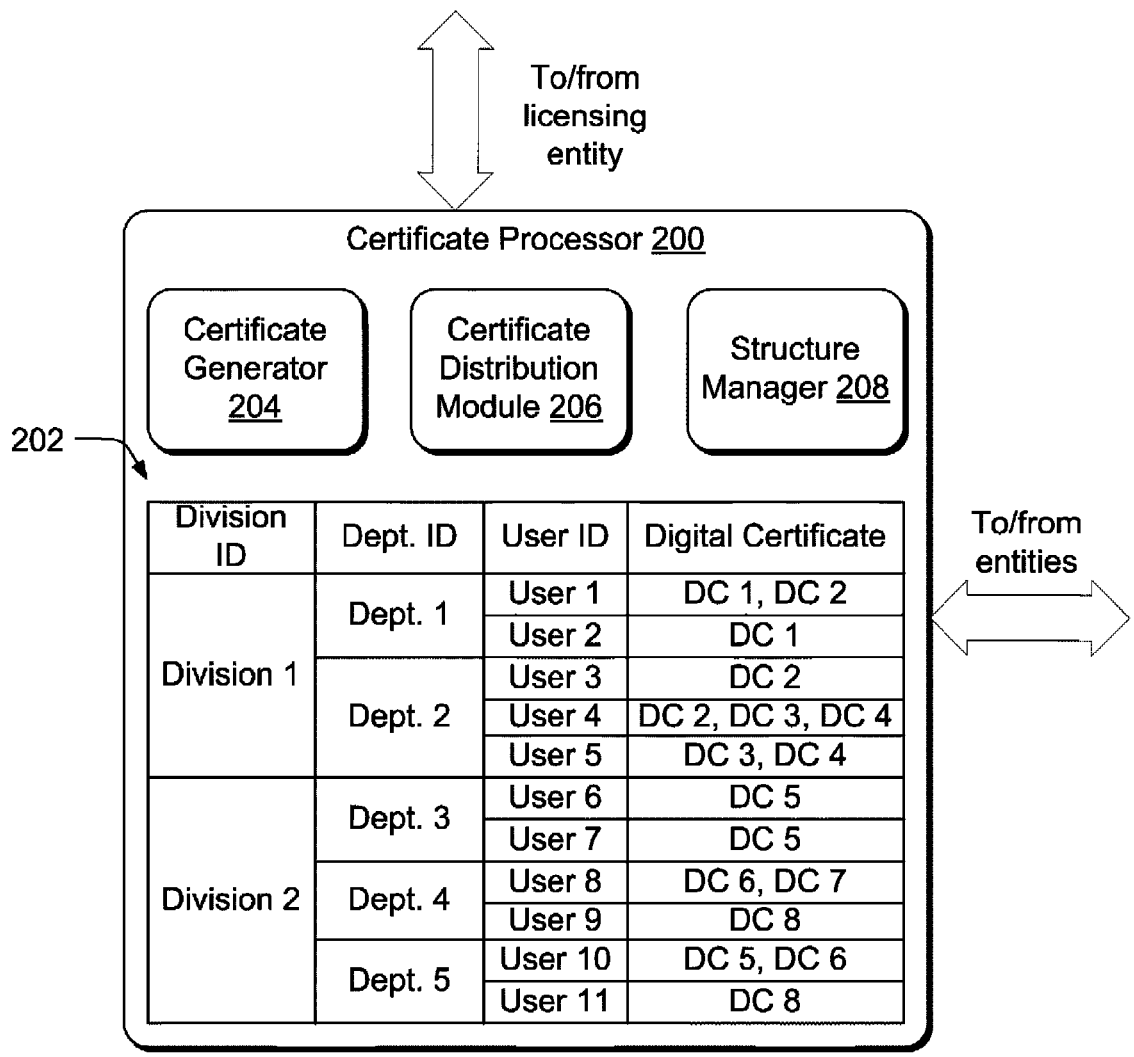
FIG. 2 illustrates an exemplary certificate processor having an exemplary relational structure for associating digital certificates with organizational entities.

FIG. 2 illustrates an exemplary certificate processor 200 having an exemplary relational structure 202 that specifies associations between digital certificates and entities within an organization. The certificate processor 200 also includes a certificate generator 204 for generating composite digital certificates composed of portions of licensor certificates and licensee certificates, a certificate distribution module 206 for distributing digital certificates to authorized entities, and a structure manager 208 that maintains the relational structure 202.

The exemplary relational structure 202 illustrated in FIG. 2 is intended for illustrative purposes only, in order to show conceptually how an organization may associate digital certificates with entities in the organization. The relational structure 202 associates organizational divisions with departments, users, and digital certificates in a hierarchical manner. Thus, users are part of departments, which in turn are part of divisions. In the particular relational structure 202 shown, digital certificates (DCs) are associated with each user. Each user is authorized to use the DCs with which they are associated.

Another implementation of the relational structure 202 employs a directory service, such as ACTIVE DIRECTORY from MICROSOFT CORPORATION. ACTIVE DIRECTORY efficiently organizes, shares and manages information about network entities, such as organizational resources, departments, and users. The directory service associates organizational entities in some fashion, such as, in a hierarchical fashion. A directory service can allow for a greater variety of relationships than those shown in FIG. 2. ACTIVE DIRECTORY can also make it easier for the licensor to perform internal audits of product usage, simplify application of policy across large groups, and other cost-saving benefits. The directory service may be accessed via light weight directory access protocol (LDAP).

The certificate processor 200 receives DCs from licensing entities, such as, but not limited to, certificate authorities (CAs), product distributors, and/or vendors. A DC from a licensing entity may be referred to as a licensor DC. The certificate generator 204 generates one or more other DCs, called licensee DCs, based on the DC issued by the licensing entity. It is possible to allow a licensor certificate to create additional licensor certificates for organizations within the licensee organization. For example, the organization 106 can generate a licensor certificate that is restricted to the accounting department. The certificate generator 204 can combine the licensee DC(s) with portions of the licensor DC to create a DC hierarchy or chain. An exemplary format of a DC hierarchy generated by the certificate generator 204 is shown in FIG. 3 and described below.

The certificate distribution module 206 distributes DCs to authorized entities in the organization. The certificate distribution module 206 identifies digital certificates in the relational structure 202 and distributes them to the entities with which they are associated as indicated by the relational structure 202. The distribution module 206 may distribute the digital certificates as entities come "on-line", when entities request digital certificates, periodically, or otherwise.

The structure manager 208 manages the relational structure 202. In one implementation of the structure manager 208, the structure manager 208 provides a user interface and processes whereby a user, such a system administrator, can add entities to the relational structure 202, create associations among entities, and assign DCs to authorized users. The associations that are made and the assignments of DCs to entities are typically based on policies and procedures specific to the organization and/or groups within the organization.

Figure 3:
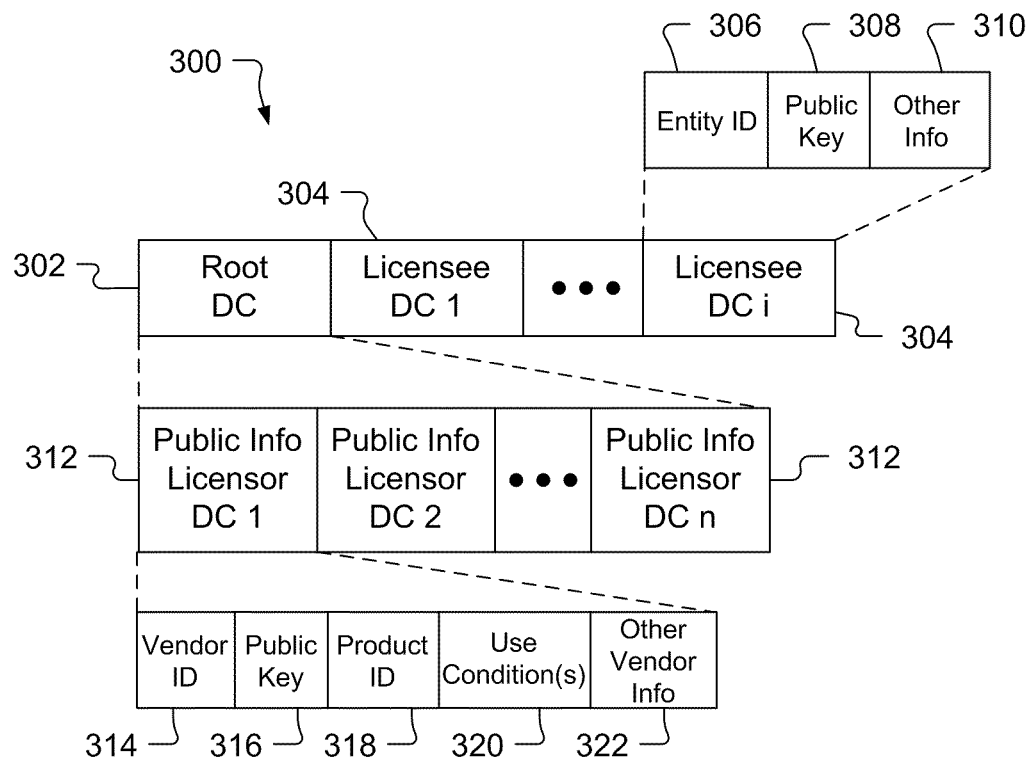
FIG. 3 illustrates an exemplary digital certificate hierarchy composed of a root licensor digital certificate and one or more licensee digital certificates.

Before describing FIG. 3, a general discussion of terminology regarding digital certificates is provided. Multiple digital certificates can be combined to form a chain or hierarchy. The initial DC from which the chain begins is referred to as the root DC. A DC that is appended to the root DC is referred to as a child of the root DC, and the root DC may be referred to as the parent of the child DC. A DC appended to the child DC is also called a child DC, and the first child is a parent to the second appended child DC. Children DCs can continue to be appended until a last child DC is appended. Since the last child DC has no children, the last child DC may also be referred to as a leaf DC.

When a hierarchy of DCs is validated, such as by a certificate validator, the validation process typically begins with the leaf DC. The leaf DC is validated as to the identity of the sender, as well as other restrictions in the leaf DC. After the leaf DC is validated, the leafs parent DC is validated. The validation process continues from child to parent up the hierarchy until a root DC is reached. In general, the validation process ensures that none of the DCs in the hierarchy are being used for a purpose that is less restrictive than any of the parent DCs. In implementations described herein, public portions of a licensor-issued DC are used as the root DC.

To illustrate an exemplary format of a composite digital certificate generated by the certificate generator 204, an exemplary DC hierarchy 300 is shown in FIG. 3. The DC hierarchy 300 includes a root DC 302, which includes public portions of a licensor DC issued by a licensing entity. The DC hierarchy 300 also includes one or more licensee-generated DCs, or licensee DCs 304 (licensee $DC_1$ through licensee $DC_i$). The DC hierarchy 300 or DCs contained therein may be constructed in accordance with a standard, such as the X.509 standard, or some other protocol agreed to by the product vendor and licensee.

The licensee DC 304 includes one or more fields relating to an organizational entity. As shown, each licensee DC 304 can include, for example, entity ID 306, a public key 308, and other information 310. Typically, the entity ID 306 and other information 310 are not included in the same licensee DC 304, but put into separate licensee DCs 304 along with a public key 308. The entity ID 306 can include one or more pieces of identity information, such as, but not limited to, entity name, address, domain name, internet protocol (IP) address, system or machine name, or location.

The public key 308 is a public key generated from a private key obtained from the licensor DC, and which can be used to validate the licensee DC 304. Other information 310 includes any other useful information, such as other information about the entity, or terms of use of the product license. For example, other information 310 could include use conditions created by a licensee organization. The organization may, for example, insert an expiration date in the other information 310 to ensure that a temporary worker can enable and use the licensed product only for a limited time. For example, the other information 310 could impose a 30 day limit on the license to limit a user to using the product for only 30 days. In this example, the user would typically renew every 10-15 days. Such a time limit can help ensure that the product could be used only for a short time if the user or the user's computer were to leave the organization.

The root DC 302 can itself be composed of a DC hierarchy. In this implementation, the root DC 302 includes only public portions of the licensor DC issued by the licensing entity. Because the private key from the issued licensor DC allows for creating more DCs that could be used to enable the licensed product, the private key from the licensor DC is not included in the root DC 302. The certificate processor 200 (FIG. 2) preferably does not expose the private key from the issued licensor DC, but only uses the private key to generate the licensee DCs 304.

As shown, the root DC 302 can include public portions from multiple licensor DCs 312 (licensor DC 1 through licensor DC n). Each of the licensor DCs 312 can include any information useful in licensing a product. For example, each licensor DC 312 can include one or more fields for a vendor ID 314, a public key 316, a product ID 318, use conditions 320, or other vendor information 322. In addition, the root DC 302 can comprise a collection of licensor digital certificates that are arranged hierarchically according to a hierarchical structure of the licensor or vendor.

The vendor ID 314 identifies the vendor of the product. The vendor ID 314 can include any vendor identity data, such as, but not limited to, the vendor's name, name abbreviation, trade name, ticker symbol, or other identifier. The public key 316 is a public key with which the vendor signs the licensor DC. The public key 316 ensures that the licensor DC 312 cannot be modified by someone other than the issuer of the licensor DC 312, and is used to authenticate the source of the licensor DC 312. The product ID 318 includes a product identifier, such as a product name, version, or other product identifiers. The product ID 318 makes the licensor DC 312 specific to the licensed product. Any of the IDs described herein, such as the vendor ID 314 or the product ID 318, may be implemented as globally unique IDs (GUIDs) or universally unique IDs (UUIDs).

Use conditions 320 include one or more conditions, restrictions, or terms related to the use or licensing of the product identified by the product ID 318. Examples of use conditions 320 include license expiration date, digital certificate enrollment requirements on the licensed entity, product feature limitations, or notification requirements on the licensed entity. An exemplary enrollment requirement obligates organizational entities to enroll with a certificate processor, such as the certificate processor 200, in order to obtain the DC hierarchy 300. An exemplary notification requirement obligates the licensed entity to contact the vendor periodically and/or provide specified information to the vendor. Other conditions, restrictions, or terms can be included in the use conditions 320.

Other vendor information 322 includes any other information useful for licensing the product, enforcing conditions on the use of the product, using the root DC 302, or others. A particular example of a digital certificate chain is described to illustrate how a DC can be used to license a product. Below is shown an exemplary DC chain:
Microsoft->MSFT License->MSFT Office License->anyorg.com->JohnDoe Above, five exemplary digital certificates are shown and labeled as follows: MICROSOFT, MSFT License, MSFT Office License, anyorg.com, and JohnDoe, with the leftmost being a root digital certificate from the licensor MICROSOFT. Proceeding from left to right, a child digital certificate appears after each ".fwdarw." (arrow) symbol. The information and terms in each of the digital certificates in the chain are described below:

---

Microsoft, restriction == none
MSFT License, restriction == license products, not valid
 as license
MSF Office License, restriction == restricted to
 Microsoft Office, not valid as license
anyorg.com, restriction == Expires 12/31/2006, max 30
 days per child certificate, not valid as license,
 child certificates only valid as license (not for
 granting further certs, signing e-mail, etc.)
JohnDoe, restrictions == identity of johndoe@anyorg.com,
 granted 3/15/2004, expires 4/14/2004, only usable as
 license (not for granting further certs, signing e-
 mail, etc.)

---

In the above example, the organization anyorg.com was granted the certificate by the vendor by generating a child certificate from the "MSFT Office License" certificate. Because each certificate is signed by the parent certificate, there is no need to communicate with either a CA or the vendor, if the tamper-resistance of an embedded certificate accepted by the product is considered sufficient. Opportunistic validation via a network is possible to strengthen this method, but validation via a network is not required. Whether or not a CA or the vendor is contacted during validation, the entire DC chain is validated to ensure to none of the certificates are being used for a purpose that is less restrictive than the parent certificate.

By way of example, an embedded certificate could be, but is not limited to, a public key of one of the parent certificates embedded within the licensed product. Because the embedded certificate is embedded in the product, the embedded certificate is preferably resistant from tampering by the licensee or entities associated with the licensee.

In addition, the restriction date for JohnDoe is Apr. 14, 2004. This is acceptable because a new certificate may be generated by the organization's certificate processor 200 at any time before the provided certificate for the entity expires. The restriction of 30 days maximum time for final certificates is exemplary to show how to reduce risk associated with an entity which previously was licensed for a product in an organization to ensure the certificate will expire before the organization's full certificate expires.

Exemplary Operations for Volume Licensing Using Digital Certificates

Described herein are exemplary methods for implementing volume licensing using digital certificates. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement volume licensing using digital certificates.

Figure 4:
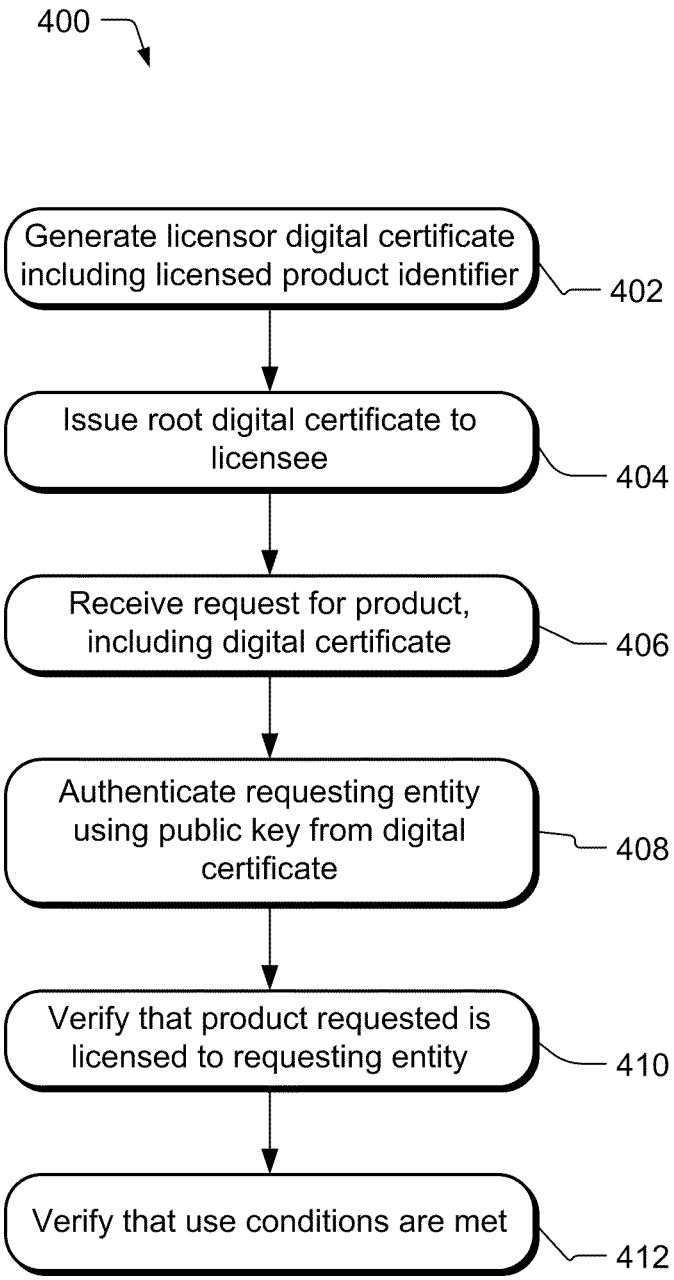
FIGS. 4-5 are flow charts illustrating operation flows or algorithms for use in enforcing a volume license using digital certificates.

FIG. 4 illustrates a volume licensing operation flow or algorithm 400 that could be executed by a vendor for licensing a product to a licensee using a digital certificate (DC). The operation flow 400 generally involves issuing the DC to the licensee and authenticating a digital certificate received from the licensee.

A generating operation 402 generates a licensor digital certificate associated with the licensed product. The licensor digital certificate includes information such as the information shown in the licensor DC 312 in FIG. 3 and may be used to create licensee-generated digital certificates. An issuing operation 404 issues the licensor digital certificate to the licensee, which can use the licensor digital certificate to enable the licensed product. A certification authority (CA) can be used to facilitate the generating operation 402 and/or the issuing operation 404.

A receiving operation 406 receives a request from an entity for a product. The request includes the licensor digital certificate or a digital certificate hierarchy formed from information in the licensor digital certificate. The request also includes identity information associated with the requesting entity, such as identity information shown in the licensee DCs 304 in FIG. 3.

An authenticating operation 408 uses identity information, such as the public key, received in the digital certificate to authenticate the requesting entity.

A verifying operation 410 verifies that the product requested by the requesting entity is licensed to the requesting entity. In one implementation, the verifying operation 410 performs a reverse domain naming system (DNS) lookup, wherein a domain name of the requesting entity is input to a DNS that responds with products licensed to the requesting entity.

Another verifying operation 412 verifies that any other use conditions, such as use conditions 320 (FIG. 3), are met. Thus, for example, if a use condition includes an expiration date, the verifying operation 412 determines whether the current date is later than the expiration date. As another example, if the use conditions require that the licensee contact the vendor with certain information periodically, the verifying operation 412 determines whether the licensee has contacted the vendor accordingly.

Figure 5:
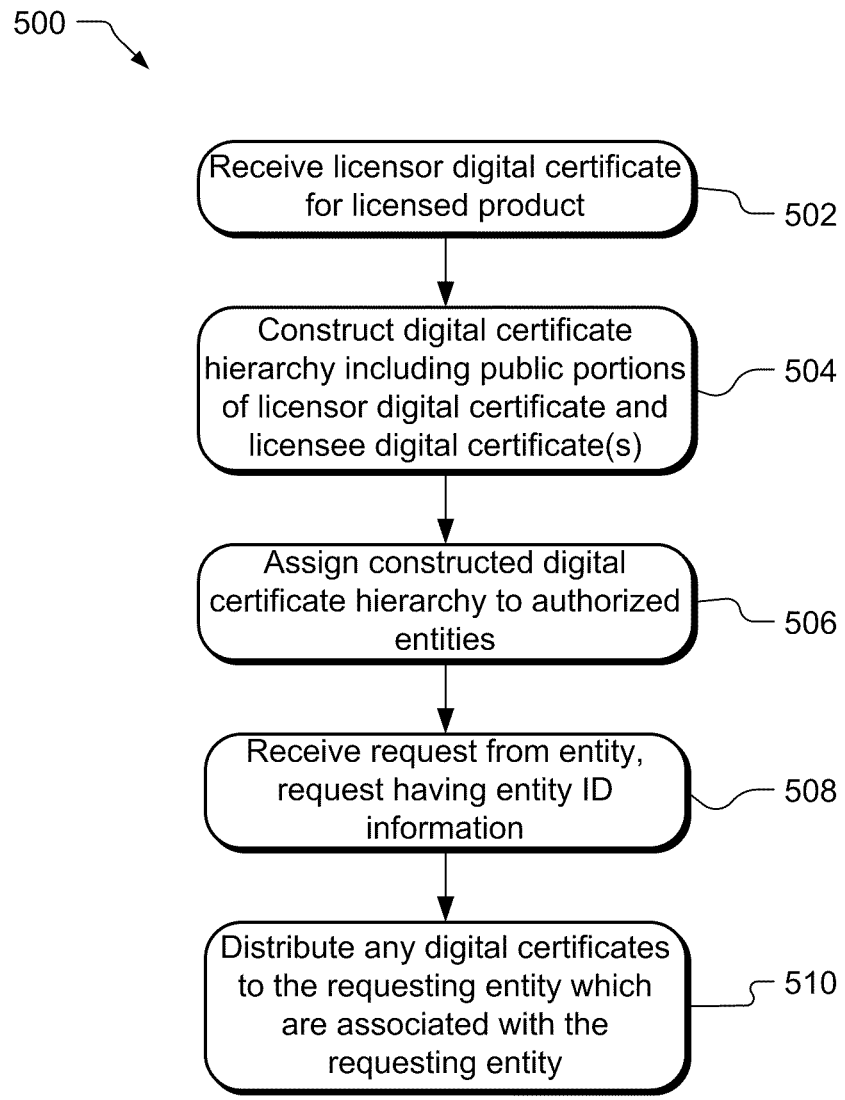

FIG. 5 illustrates a digital certificate management operation flow or algorithm 500 that could be executed by an organization with multiple entities for assigning and distributing digital certificates to the entities. The operation flow 500 can help ensure that only authorized entities within the organization will be able to enable licensed products. Steps such as those shown in the operation flow 500 may be required by a vendor, or other licensing entity, as a condition to maintaining the license.

A receiving operation 502 receives a root digital certificate from the vendor for a licensed product. A constructing operation 504 constructs one or more digital certificate hierarchies using the root digital certificate and one or more licensee digital certificates. In one implementation, the constructing operation 504 constructs a digital certificate hierarchy that corresponds to an organizational hierarchy of entities within the organization. Exemplary root DC 302 and licensee DC 304 are shown and described above with respect to FIG. 3.

An assigning operation 506 assigns the digital certificate hierarchies to authorized entities within the organization. One implementation of the assigning operation 506 involves populating a relational structure or directory service with entity identifiers and digital certificates, and creating associations among the entity identifiers and the digital certificates. The associations can be chosen by a system administrator or other user, typically based on policies and procedures defined by the organization or groups within the organization.

A receiving operation 508 receives a request for a digital certificate from an entity. The request includes entity identity information, such as computer identifier, network address, user name, biometric data, password, location, domain name, or others. The entity identity information is used to determine which, if any, digital certificates are assigned to the requesting entity.

A distributing operation 510 determines whether the requesting entity is authorized to access any digital certificates that would enable the entity to use the associated licensed products. One implementation of the distributing operation 510 accesses a directory service via light weight directory access protocol (LDAP). The directory service returns any digital certificates associated with the requesting entity, based on the entity identity information.

Exemplary Computing Device

Figure 6:
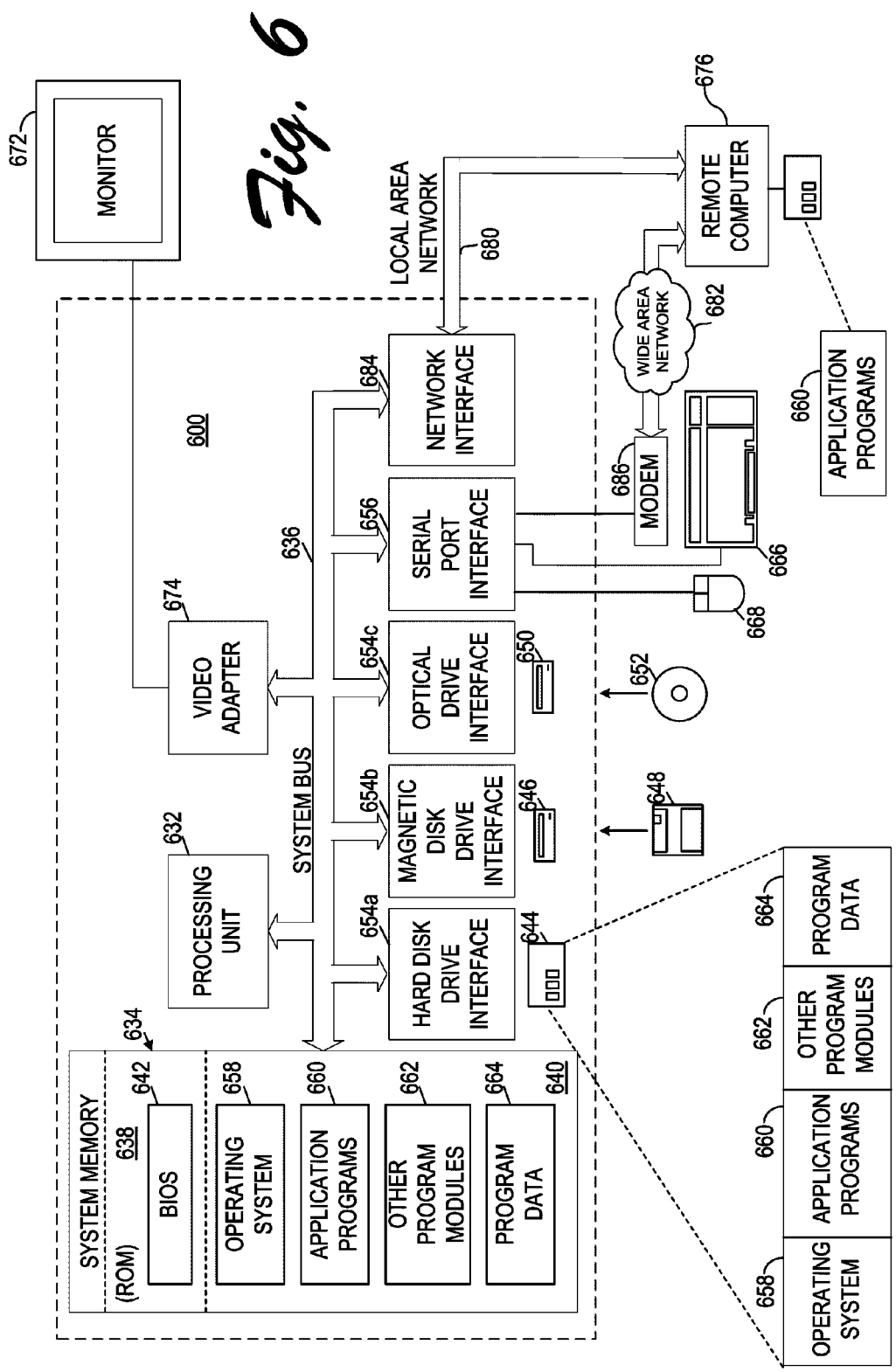
FIG. 6 is a schematic illustration of an exemplary computing device that can be utilized to implement volume licensing with digital certificates.

FIG. 6 is a schematic illustration of an exemplary computing device 600 that can be utilized to implement systems, algorithms, data structures, and computer-readable media for volume licensing using digital certificates. Computing device 600 includes one or more processors or processing units 632, a system memory 634, and a bus 636 that couples various system components including the system memory 634 to processors 632. The bus 636 represents one or more of any of several types of bus structures, including a memory bus or memory controller, a peripheral bus, an accelerated graphics port, and a processor or local bus using any of a variety of bus architectures. The system memory 634 includes read only memory (ROM) 638 and random access memory (RAM) 640. A basic input/output system (BIOS) 642, containing the basic routines that help to transfer information between elements within computing device 600, such as during start-up, is stored in ROM 638.

Computing device 600 further includes a hard disk drive 644 for reading from and writing to a hard disk (not shown), and may include a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by appropriate interfaces 654a, 654b, and 654c. The drives and their associated computer-readable media provide nonvolatile storage of computer-readable instructions, data structures, program modules and other data for computing device 600. Although the exemplary environment described herein employs a hard disk, a removable magnetic disk 648 and a removable optical disk 652, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 644, magnetic disk 648, optical disk 652, ROM 638, or RAM 640, including an operating system 658, one or more application programs 660, other program modules 662, and program data 664. A user may enter commands and information into computing device 600 through input devices such as a keyboard 666 and a pointing device 668. Other input devices (not shown) may include a microphone, joystick, game pad, satellite dish, scanner, or the like. These and other input devices are connected to the processing unit 632 through an interface 656 that is coupled to the bus 636. A monitor 672 or other type of display device is also connected to the bus 636 via an interface, such as a video adapter 674.

Generally, the data processors of computing device 600 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 600. At execution, the programs are loaded at least partially into the computing device's 600 primary electronic memory.

Computing device 600 may operate in a networked environment using logical connections to one or more remote computers, such as a remote computer 676. The remote computer 676 may be a personal computer, a server, a router, a network PC, a peer device or other common network node, and typically includes many or all of the elements described above relative to computing device 600. The logical connections depicted in FIG. 6 include a LAN 680 and a WAN 682. The logical connections may be wired, wireless, or any combination thereof.

The WAN 682 can include a number of networks and subnetworks through which data can be routed from the computing device 600 and the remote computer 676, and vice versa. The WAN 682 can include any number of nodes (e.g., DNS servers, routers, etc.) by which messages are directed to the proper destination node.

When used in a LAN networking environment, computing device 600 is connected to the local network 680 through a network interface or adapter 684. When used in a WAN networking environment, computing device 600 typically includes a modem 686 or other means for establishing communications over the wide area network 682, such as the Internet. The modem 686, which may be internal or external, is connected to the bus 636 via a serial port interface 656.

In a networked environment, program modules depicted relative to the computing device 600, or portions thereof, may be stored in the remote memory storage device. It will be appreciated that the network connections shown are exemplary and other means of establishing a communications link between the computers may be used.

The computing device 600 may be implemented as a server computer that is dedicated to server applications or that also runs other applications. Alternatively, the computing device 600 may be embodied in, by way of illustration, a stand-alone personal desktop or laptop computer (PCs), workstation, personal digital assistant (PDA), server computer, or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A computer-implemented method for enforcing a license of a software product licensed to an organization including a plurality of entities, the method comprising:
   accessing the license of the software product, the license including an organizational identifier associated with the organization and a parent digital certificate authorizing the organization to enable functionalities associated with the software product;
   generating a composite digital certificate based at least in part on the parent digital certificate,
   the composite digital certificate including a portion of the parent digital certificate, at least one child certificate, and a subset of the functionalities corresponding to the at least one child certificate,
   at least one functionality of the subset of the functionalities being specific to the at least one child certificate,
   the at least one child certificate being associated with a device corresponding to an entity of the plurality of entities, the entity being a sub-licensee of the software product, and
   receiving a request from the device to use a functionality of the functionalities associated with the software product;
   authenticating the entity based at least in part on the composite digital certificate;
   based at least in part on authenticating the entity, determining that the functionality is part of the subset of the functionalities; and
   authorizing the functionality to be enabled on the device.

2. The computer-implemented method of claim 1, further comprising generating the composite digital certificate by inserting a product identifier corresponding to the software product and a use condition related to the software product into the at least one child certificate.

3. The computer-implemented method of claim 1, wherein:
   the request comprises a use condition related to the software product; and
   the computer-implemented method further comprises:
   determining that the use condition is satisfied; and
   based at least in part on determining that the use condition is satisfied, enabling the functionality.

4. The computer-implemented method of claim 1, wherein the composite digital certificate further includes multiple child certificates, each child certificate of the multiple child certificates including an entity identifier that identifies a corresponding entity in the organization.

5. The computer-implemented method of claim 1, further comprising validating the composite digital certificate using a public key of a certificate authority.

6. The computer-implemented method of claim 1, further comprising looking up a domain name associated with the entity in a domain naming system (DNS) to determine whether the software product is licensed to the entity.

7. The computer-implemented method of claim 1, wherein generating the composite digital certificate further comprises generating one or more use conditions related to the software product, the one or more use conditions comprising at least one of:
   an expiration time;
   an enrollment requirement specifying that the entity must enroll to receive the composite digital certificate;
   a notification requirement specifying that the entity must notify an issuer with specified information;
   physical location; or a product feature limitation.

8. The computer-implemented method of claim 1, further comprising accessing a directory service using a light weight directory access protocol to create an association between the composite digital certificate and the entity.

9. The computer-implemented method of claim 8, wherein creating the association between the composite digital certificate and the entity comprises creating a relational structure storing an entity identifier corresponding to the entity and the composite digital certificate.

10. A computer-implemented system that includes computer components stored in a computer readable media and executable by one or more processors for forming or using a composite digital certificate, the composite digital certificate comprising:
   a root digital certificate comprising a product identifier field storing a product identifier identifying a product, the product being associated with one or more functionalities executable by the one or more processors;

a child digital certificate comprising a first user identifier field storing a first user identifier identifying a first user granted authority to enable a first functionality of the one or more functionalities for use by virtue of the composite digital certificate, the child digital certificate being a child to the root digital certificate in the composite digital certificate; and a leaf digital certificate comprising a second user identifier field storing a second user identifier identifying a second user granted authority to enable a second functionality of the one or more functionalities for use by virtue of the digital certificate, the leaf digital certificate being a child to at least one of the child digital certificate in the composite digital certificate or the root digital certificate in the composite digital certificate and the second functionality being different from the first functionality.

11. The system as recited in claim 10, wherein the leaf digital certificate further comprises a use condition field storing a use condition related to use of the product.

12. The system as recited in claim 10, wherein the root digital certificate further comprises an issuer identifier field identifying an issuer of the product.

13. The system as recited in claim 10, wherein the leaf digital certificate is generated by a certificate processor that associates entities of digital certificates within an organization.

14. The system as recited in claim 10, wherein an association is created between the composite digital certificate and the second user, the association created using a light weight directory access protocol.

15. The system as recited in claim 10, wherein an association is created between the composite digital certificate and the second user, the association created in a relational structure storing the second user identifier and the composite digital certificate.

16. A computer-implemented system for authenticating a particular entity based on a composite digital certificate, the system including computer components stored in a computer readable media and executable by one or more processors, the computer components comprising a certificate validator to enable a use of one or more functionalities associated with a licensed software product based at least in part on performing operations comprising:

receiving, from a device corresponding to the particular entity, a product request including reference to a composite digital certificate from the particular entity, the composite digital certificate including:

a parent digital certificate having a product identifier identifying the licensed software product; and a plurality of child digital certificates of the root digital certificate in the composite digital certificate, a child digital certificate of the plurality of child digital certificates having an entity identifier identifying an entity of a plurality of associated entities that are granted authority to enable a functionality of the one or more functionalities by virtue of the composite digital certificate, an entity identifier of the entity identifiers identifying the particular entity; and validating the product request based at least partly on the product identifier and the entity identifier identifying the particular entity.

17. The computer-implemented system as recited in claim 16, the operations further comprising creating an association between the composite digital certificate and the particular entity based at least in part on a light weight directory access protocol.

18. The computer-implemented system as recited in claim 16, the operations further comprising creating an association between the composite digital certificate and the particular entity in a relational structure storing the entity identifier and the composite digital certificate.

19. The computer-implemented method of claim 1, wherein the subset of the functionalities corresponding to the at least one child certificate are more restrictive than the functionalities associated with the software product.

20. The computer-implemented method of claim 1, wherein other functionalities in the subset of the functionalities corresponding to the at least one child certificate are shared by one or more other child certificates.

* * * * *